United States Patent [19]

Rosenblad

[11] 4,279,126
[45] Jul. 21, 1981

[54] METHOD OF UTILIZING RESIDUAL HEAT IN THE PRODUCTION OF CELLULOSE AND AN INSTALLATION FOR CARRYING OUT THE METHOD

[75] Inventor: Gösta Rosenblad, Gothenburg, Sweden

[73] Assignee: Generator Industri AB, Sweden

[21] Appl. No.: 969,060

[22] Filed: Dec. 13, 1978

[30] Foreign Application Priority Data

Dec. 21, 1977 [SE] Sweden ............................... 7714563

[51] Int. Cl.³ ............................................ F01K 25/14
[52] U.S. Cl. .................................................. 60/651
[58] Field of Search .................. 60/648, 651, 670, 671

[56] References Cited

U.S. PATENT DOCUMENTS

| | | | |
|---|---|---|---|
| 1,272,378 | 7/1918 | Collins | 60/671 |
| 3,878,683 | 4/1975 | Imai | 60/651 |
| 4,033,141 | 7/1977 | Gustafsson | 60/651 |
| 4,191,021 | 3/1980 | Nakamura et al. | 60/671 |

FOREIGN PATENT DOCUMENTS 397755  8/1933  United Kingdom ..................... 60/670

*Primary Examiner*—Stephen A. Kreitman
*Attorney, Agent, or Firm*—Brumbaugh, Graves, Donohue & Raymond

[57] ABSTRACT

A method and an installation for the utilization of residual heat in pulp mills, where spent cooking liquor is evaporated with vapor in a multi-stage evaporator. The installation for carrying out the method comprises a number of evaporation steps connected in such a way, possibly by arranging several steps or groups of steps in parallel, that the outlet vapor from the last step or steps holds saturation pressure immediately below atmospheric pressure, a heat exchanger for condensation of the outlet vapor from the evaporation steps during evaporation of a fluid which, for the corresponding amount of heat, at the actual heat exchange temperature, has a markedly smaller volume than the outlet vapor, a turbine for expansion of the fluid vapor, a condenser for condensing the outlet vapor from the turbine, and a pump for increasing the pressure of the condensed fluid to a pressure suitable for return to the heat exchanger.

14 Claims, 1 Drawing Figure

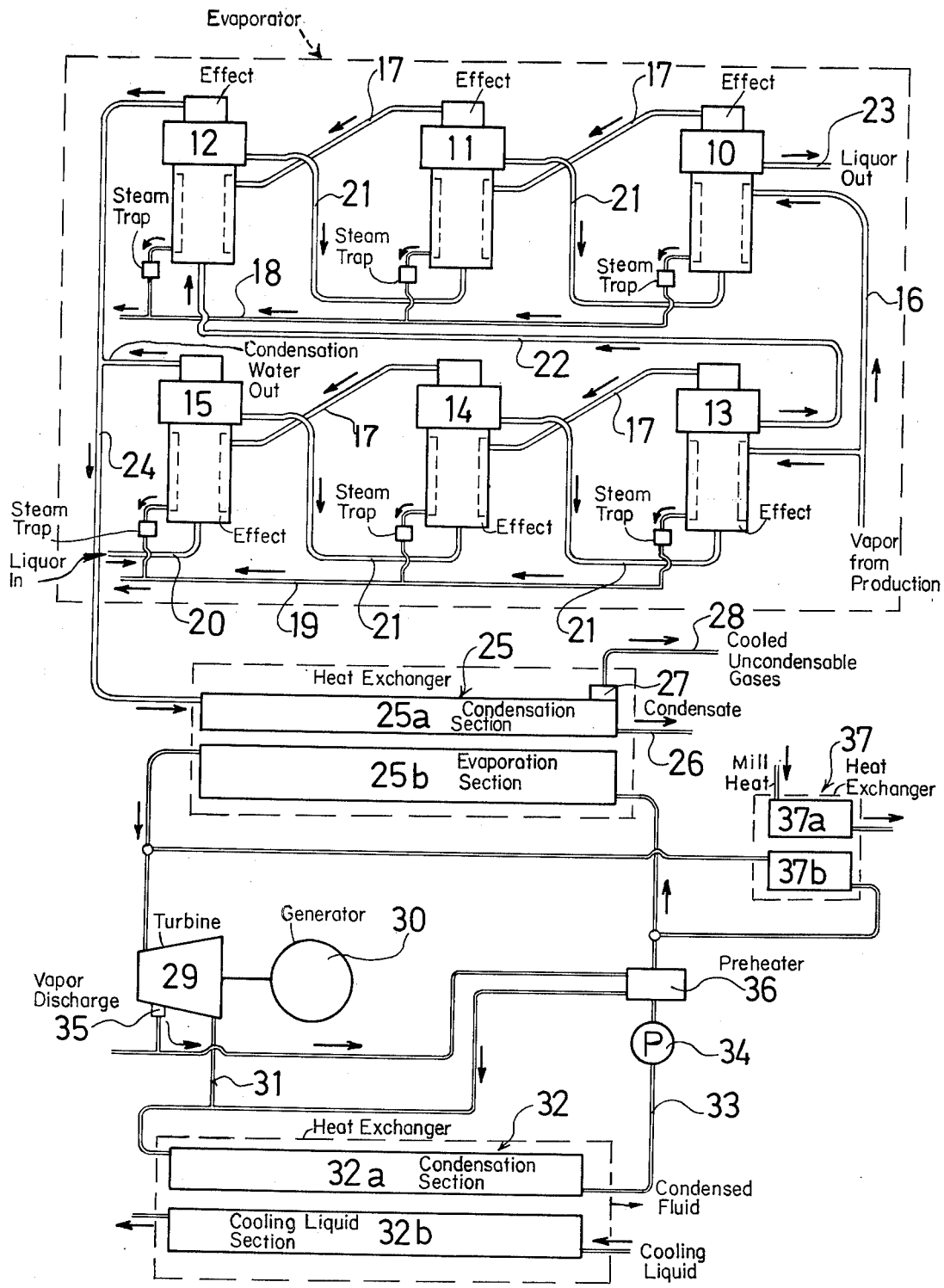

METHOD OF UTILIZING RESIDUAL HEAT IN THE PRODUCTION OF CELLULOSE AND AN INSTALLATION FOR CARRYING OUT THE METHOD

BACKGROUND OF THE INVENTION

The present invention relates to a method and an installation for the utilization of residual heat in pulp mills, where spent cooking liquor is evaporated with vapour in a multi-stage evaporator.

In pulp mills with highly advanced recovery, including combustion of spent cooking liquor, and electric generation in a counter-pressure turbine, a considerable surplus of hot water is given at temperatures in the range of 50°-60° C.

It has been proposed to utilize this hot water in district heat distribution networks but, on one hand, a condition therefor is a certain geographical location of the mill in relation to prospective consumers and, on the other hand, the piping always entails a heavy cost. Moreover, in district heating plants the temperature of available water is lower than what is normally the case. Finally, the demand for district heating is least in summer when the supply of surplus heat in the mill is at its highest.

A large heat consumer in the process is the evaporation plant for the above-mentioned liquor, which becomes an essential producer of 50°-60° C. water.

The desire for saving heat energy has since long resulted in arranging the evaporation in several successive stages or so-called effects. Usually five, but also four or six effects may be provided. At an initial temperature of about 140° C. of the vapour discharged from the counter-pressure turbine, the temperature on the liquor side of the last effect will be in the range of 55°-60° C.

The lower limit is, for one thing, due to difficulties with pulsations which physically depend on the course of the vapour pressure curve and the heights of the liquid columns in the evaporation apparatuses. Thus, the drop in temperature between about 60° C. and ambient temperature cannot be used for evaporation. The hot water produced during the condensation of the outlet vapour contributes to the low-temperature surplus in the mill.

A steam turbine is actually the only machine element that can utilize the drop in heat between 60° C. and ambient temperature in a rational manner. To allow the vapour after the evaporation plant to pass a vacuum turbine for final expansion is theoretically possible and also right but it meets with certain practical difficulties. It will be a matter of extremely heavy pipelines and particularly expensive turbines and to this should be added the risk of deposits on the turbine blades from pulp particles coming from the liquor and entrained with the vapour, and problems with the compression of uncondensable gases introduced with the liquor.

BRIEF SUMMARY OF THE INVENTION

According to the invention a more rational use may be made of the drop in heat during the evaporation, all the way down to ambient temperature. By arranging the evaporation effects in a suitable way the final temperature in the evaporation plant can be increased to about 100° C., preferably about 70° C.

A former 5-effect evaporation plant may arranged so as to obtain, for instance two parallel flows of vapour through, respectively, two and three effects. The incoming thin liquor is evaporated in a triple effect while the liquor thus thickened, is evaporated in a double effect. Outlet vapour from 100° C. will thus be available without the degree of evaporation being affected.

Such an arrangement can be made within the limits of generally available equipment but the effects may preferably be increased to two times three.

The capacity of the evaporator plant will be increased because the higher average temperature will reduce the viscosity of the liquor.

The higher vapour pressure results in radically reduced vapour volumes which should reduce the risk of foaming to such a degree that it will probably not be necessary to mix up the incoming thin liquor with a thicker liquor, as is actual practice for preventing foaming. The liquor concentrations, which will thus be lower, lead to a reduced number of ineffective temperature drops due to boiling-point increases and, consequently, to a more efficient evaporation. Contributory to this is the fact said circulation of liquor requires a certain share of the heat transmission capacity of the station without therefore resulting in any water evaporation.

In direct expansion in a steam turbine the pipeline dimensions will certainly be reduced in an obvious manner, as compared to starting from vapour of 60° C., but it still is a matter of large vapour volumes, which causes problems on the regulation side. Difficulties with compression of uncondensable gases remain if a surface condenser is used and there is a risk of environmental contamination if a mixing condenser is used. Consideration should also be paid to the risk of deposits from the liquor.

Now, however, a possibility has been provided to drive the turbine with another medium than aqueous steam, after heat exchange. It is possible to use such media as ammonia, common cooling media—type F12, and the like.

The advantages with these working media are that the dimensions of the turbine can be considerably reduced, that inlets of moderate size and conventional control valves may be used and that conduits of moderate dimensions can transport the volatilized fluid to a suitable location within the mill, where the turbine in question is best placed with regard to e.g. the demand for cooling water. Another considerable advantage is that uncondensable gases from the evaporation can be separated at atmospheric pressure or thereabout, and be pumped into a destruction furnace without much additional work.

By way of comparison it may be mentioned that for a certain calculated case, 51 m$^3$/s aqueous steam at a pressure of 0.9 bar and a temperature of 97° C. at the inlet of the turbine resulted in a flow of about 1000 m$^3$/s at a pressure of 0.04 bar and a corresponding saturation temperature of 29° C. at the outlet from the turbine. The corresponding values for F12 and ammonia at the inlet will be 29 and 53.5 bar, respectively, at a temperature of 92° C. in both cases, and at the outlet 7 and 11 bar, respectively, at saturation temperatures of 29° C. The flow rates will be 2.3 and 1.3 m$^3$/s, respectively, at the inlet, and 10.6 and 5.8 m$^3$/s, respectively, at the outlet.

The latter values clearly illustrate the considerable advantages to be gained, concerning piping, space requirements for the turbine and the regulation possibilities, by using, at the temperatures here concerned, a medium that, at higher pressure but at the same temperature, has a considerably smaller specific volume than aqueous steam.

In accordance with the invention it is proposed that the evaporation of liquor be operated in a number of effects which, on the vapour side, may be connected several in series as well as in several parallel series, and that the outlet vapour therefrom be condensed in heat exchangers during evaporation of a fluid the volume of which, in vaporous form, for a corresponding amount of heat and at the pressure and the somewhat lower temperature that is dependent on the temperature difference required for the transfer of heat, is markedly less than that of the aqueous steam.

The method according to the invention is characterized by:- arranging, on the vapour side, evaporation steps in series in such a way, possibly by connecting steps or groups of steps in parallel, that outlet vapour after the last steps holds a saturation pressure immediately below the atmospheric pressure; condensing the outlet vapour in a heat exchanger during evaporation of a fluid the volume of which in the form of vapour, for the amount of heat which can be extracted from the outlet vapour, and at the somewhat lower temperature which is dependent on the temperature difference required for the heat transfer, is markedly lower than that of the outlet vapour; and expanding in a turbine the vapour of the boiled-off fluid in an otherwise conventional steam power process, while yielding mechanical work; condensing the vapour in a condenser; and, after pumping to the required pressure, returning the fluid for renewed evaporation in the heat exchanger.

The installation according to the invention is characterized by: a number of evaporation steps, connected in such a way, possibly by arranging several steps or groups of steps in parallel, that the outlet vapour from the last step or steps holds saturation pressure immediately below atmospheric pressure; a heat exchanger for condensation of the outlet vapour from the evaporation steps during evaporation of a fluid which, for the corresponding amount of heat, at the actual heat exchange temperature, has a markedly smaller volume than the outlet vapour; a turbine for expansion of the fluid vapour; a condenser for condensing the outlet vapour from the turbine; and a pump for increasing the pressure of the condensed fluid to a pressure suitable for return to the heat exchanger.

The invention will be described more fully hereinbelow with reference to the accompanying drawing.

BRIEF DESCRIPTION OF THE FIGURE

The sole FIGURE of the drawing is a schematic illustration in block diagram form, that illustrates an evaporation plant and a turbine installation driven by a fluid which has been evaporated through heat transfer from the outlet vapour of the evaporation plant.

DESCRIPTION OF PREFERRED EMBODIMENT

At the top of the figure an evaporation plant is shown, comprising six evaporation steps, or effects, 10-15, arranged in two groups with three steps in each. Vapour having a saturation temperature of about 140° C. is taken from a suitable point in the production and is carried via a conduit 16 to the steps 10 and 13.

The vapour is condensed in the steps during removal of vapour from the liquor and this secondary vapour is passed, via connection conduits 17, to the next evaporation steps, 11 and 14, respectively, and then passed on to 12 and 15, respectively. The condensation water from the evaporation steps collects in conduits 18 and 19, respectively. Thin liquor is supplied through a conduit 20 to the evaporation step 15 and is passed via connecting conduits 21 to the steps 14 and 13, and therefrom via a cross-over pipe 22 to the evaporation step 12, and from this step further on through the steps 11 and 10 in order to leave the last step via a conduit 23 after being evaporated to the desired degree.

The outlet vapour from the last evaporation steps 12 and 15 in either series is led via a conduit 24 to the condenser section 25a of a heat exchanger 25.

The evaporation plant shown is only one example of conceivable plants and anyone skilled in the art readily realises what modifications concerning the number and the type of effects, are necessary to suit the requirements of a certain plant. The connection on the liquor side between the evaporation steps may, if this is found preferable, be carried out in another way than shown. The essential point is that, while the initial temperature of the vapor supplied is essentially the same as in a conventional plant and, with the same degree of evaporation, the saturation temperature of the outlet vapour will be higher than that usually dealt with, viz. about 100° C., preferably about 70° C., instead of 50°-60° C.

The heat exchanger 25 may be of any known type desired and comprises a condensation section 25a and an evaporation section 25b. Condensate from the section 25a is led off through a conduit 26 for treatment within the mill. Uncondensable gases accompanying the vapour are collected and cooled in a device 27 and are passed over through a conduit 28 to a destruction furnace or evacuation chimney.

The evaporation section 25b is included in a closed system operating with a fluid which in vaporous state, for the corresponding amount of heat and at the pressure and temperature actually concerned, has a markedly smaller volume than the outlet vapour.

Suitable fluids are, for instance, ammonia and cooling fluid of type F12. Comparative data of these fluids and aqueous steam have already been given in this specification and need not be repeated.

The vapour boiled off in 25b is passed to a turbine 29 which drives an electric generator 30. Considering the data reported above as to volumes and pressure it is quite obvious that the turbine as well as the conduit system will have essentially smaller dimensions than the case would be if outlet vapour had been passed from the evaporation steps via the conduit 24 to a vacuum steam turbine.

The outlet vapour from the turbine 29 is passed via a conduit 31 to a condenser 32 which comprises separate sections 32a and 32b, respectively, for the condensing fluid and the cooling liquid. The cooling in the latter section is effected under utilization of the lowest possible ambient temperature.

From 32a the condensed fluid is passed via a conduit 33 back to the heat exchanger 25, and a pump 34 increases the pressure of the fluid to suit evaporation in the heat exchanger section 25b. When calculating the efficiency of the plant it must be borne in mind that the feed pump work in the cases concerned will be more powerful than in a conventional steam power plant.

The fluid-vapour turbine 29 may be provided in a conventional manner with one or more means 35 for discharge of vapour, for instance, in order to preheat the liquid phase of the fluid in one or more heaters 36 between the pump 34 and the heat exchanger 25 or for other heating requirements within the mill.

In some cases it may be important also to make use of other residual heat in the mill, for instance from turpentine cooling, degassing, etc. In that case a second heat exchanger 37 is arranged where this residual heat is utilized in one section 37a in order to bring about evaporation of a certain portion of the system fluid in a second section 37b.

Thus, the section 37b is coupled in parallel with the section 27b, as far as the turbine 29 and the condenser 32 are concerned. This branch of the circulation system may, if desired, be provided with a separate pump.

The proposed arrangement makes it possible entirely to eliminate the excess of low-value heat energy and considerably to increase electric generation. If excess thereof should occur, electric power may be delivered to the high-voltage network via the normal communication lines of the mill from this network.

To satisfy the various requirements within a complex mill installation it may be found suitable to modify or complete the system schematically described herein. No supervision and control equipment has been shown but the arrangement of such equipment as well as suitable modifications within the scope of the claims is a matter of professional skill.

I claim:

1. A method of utilizing residual heat in a pulp mill of a paper making process and where spent cooling liquor is evaporated in a multiple-effect evaporator using vapor evaporated from the liquor as a heating medium, comprising the steps of:
   (a) providing, from at least one last effect of the multiple-effect evaporator, outlet vapor holding a saturation pressure in a range immediately below atmospheric pressure;
   (b) condensing said outlet vapor in one side of a heat exchanger;
   (c) supplying, for evaporation in the other side of the heat exchanger, a working fluid having in vaporous form, a volume substantially lower than that of the outlet vapor from the evaporator for the amount of heat extracted from the outlet vapor in the exchanger and at a temperature sufficiently lower than that of the outlet vapor in the heat exchanger so as to cause heat transfer;
   (d) expanding, in a turbine, the vapor of the evaporated working fluid for producing mechanical work by a steam power process;
   (e) condensing the vapor of the evaporated working fluid in a condenser;
   (f) pumping the condensed working fluid to a higher pressure; and
   (g) returning the condensed working fluid to the heat exchanger for further evaporation.

2. A method as claimed in claim 1 including keeping the outlet vapor after the last effect in the evaporator at a saturation temperature in the range from above 60° C. to 100° C.

3. A method as claimed in claim 1 or 2 further including the step of preheating the condensed working fluid with vapor of the working fluid discharged from the turbine.

4. A method as claimed in claim 1 or 2 wherein the step of supplying comprises supplying a working fluid chosen from the group comprising ammonia and suitable organic fluids.

5. The method according to claim 2 wherein the step of keeping the outlet vapor saturation temperature in the range includes keeping the temperature thereof at approximately 70° C.

6. The method according to claim 1 wherein the step of providing outlet vapor includes directing liquor serially through the multiple effects of the multiple effect evaporator, and directing vapor simultaneously along parallel paths of vapor flow to at least two of the multiple effects through which liquor serially flows.

7. The method according to claim 6 wherein the two effects to which vapor is simultaneously directed are the first in two series of effects with interconnected vapor flow provisions, the step of providing outlet vapor further comprises directing vapor produced in effects in each series to a subsequent effect in the series and directing vapor from the last effect in each series to be used as the outlet vapor condensed in the heat exchanger.

8. An installation for utilizing residual heat in a pulp mill of a paper making process and where spent cooling liquor is evaporated in a multiple-effect evaporator using vapor evaporated from the liquor as a heating medium, comprising:
   (a) a multiple-effect evaporator means for providing, from at least one last effect, outlet vapor holding a saturation pressure in a range immediately below atmospheric pressure;
   (b) heat exchanger means connected to the evaporator for condensing said outlet vapor in one side of a heat exchanger;
   (c) fluid circuit means connected to the other side of the heat exchanger and having therein, for evaporation in the other side of the heat exchanger, a working fluid having, in vaporous form, a volume substantially lower than that of the outlet vapor from the evaporator for the amount of heat extracted from the outlet vapor in the exchanger and at a temperature sufficiently lower than that of the outlet vapor in the heat exchanger so as to cause heat transfer;
   (d) turbine means, connected into said fluid circuit means, for expanding the vapor of the evaporated working fluid and producing mechanical work by a steam power process;
   (e) means for condensing the vapor of the evaporated working fluid in a condenser;
   (f) means for pumping the condensed working fluid to a higher pressure; and
   (g) means for returning the condensed working fluid to the heat exchanger for further evaporation.

9. The installation as claimed in claim 8 wherein the evaporator means comprises means for providing the outlet vapor after the last effect in the evaporator at a saturation temperature in the range from above 60° C. to 100° C.

10. The installation as claimed in claim 8 or 9 further including means for preheating the condensed working fluid with vapor of the working fluid discharged from the turbine.

11. The installation as claimed in claim 8 or 9 wherein the working fluid is chosen from the group comprising ammonia and suitable organic fluids.

12. The installation according to claim 9 wherein said means for providing the outlet vapor saturation temperature in the range includes means providing the temperature thereof at approximately 70° C.

13. The installation according to claim 8 wherein the evaporator means includes means for directing liquor serially through the multiple effects of the multiple effect evaporator, and means for directing vapor simultaneously along parallel paths of vapor flow to at least two of the multiple effects through which liquor serially flows.

14. The installation according to claim 13 wherein the two effects to which vapor is simultaneously directed are the first in two series of effects with interconnected vapor flow provisions, the evaporator means further comprising means for directing vapor produced in effects in each series to a subsequent effect in the series and means for directing vapor from the last effect in each series to said heat exchanger.

* * * * *